United States Patent

[11] 3,596,559

[72] Inventor Arthur R. Gregersen
 Hinsdale, Ill.
[21] Appl. No. 842,665
[22] Filed July 17, 1969
[45] Patented Aug. 3, 1971
[73] Assignee Ty Miles, Inc.
 Westchester, Ill.

[54] SHUTTLE FIXTURE FOR BROACH OR THE LIKE
 13 Claims, 5 Drawing Figs.
[52] U.S. Cl. .................................................. 90/76,
 90/85, 90/88, 90/89, 269/61, 269/73
[51] Int. Cl. ....................................................... B23d 41/02,
 B23q 3/18
[50] Field of Search .......................................... 90/85, 89,
 71, 76, 77, 87, 88; 269/61, 58, 67, 68, 74, 79, 71,
 73

[56] References Cited
UNITED STATES PATENTS
2,405,434 8/1946 Krainer ........................ 90/85 X Primary Examiner—Gil Weidenfeld
Attorney—Darbo, Robertson and Vandenburgh ABSTRACT: A workpiece holder is mounted in front of a broach cutting tool moving along a vertical path. The holder is on a slide which is movable downwardly at an angle toward the path. The bottom of the slide has an abutment positioned to contact one of a plurality of faces of a rotatable stop means. The faces of the stop means are at different radial distances from the axis of rotation so that when the abutment is against one of the faces the holder is closer to the path than when the abutment is against another of the faces. Power means are connected to the slide an to the stop means to raise the slide after a downward cutting movement of the broach and, after an upward movement of the broach, to rotate the stop means to present a new face and to lower the slide against that new face.

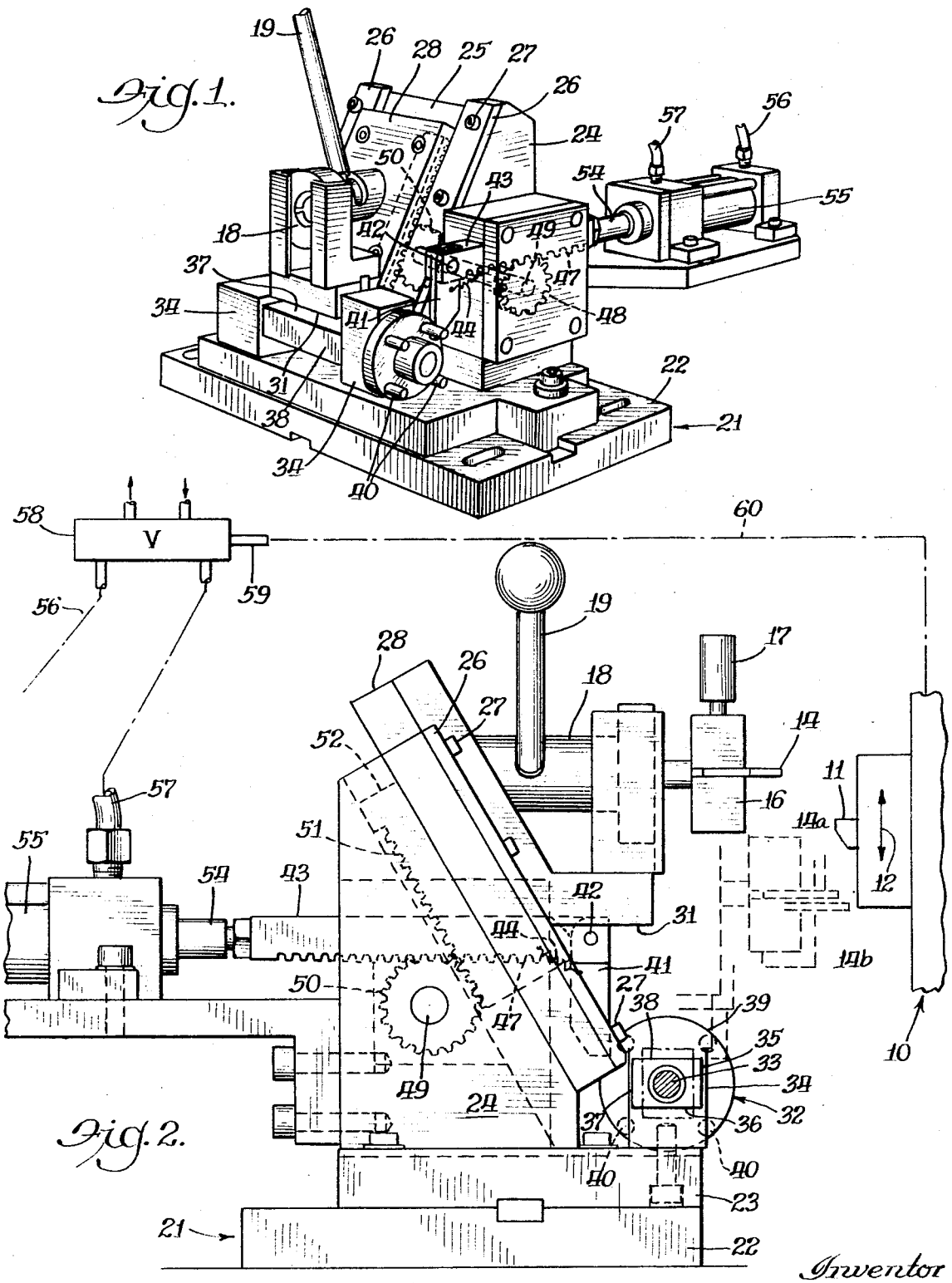

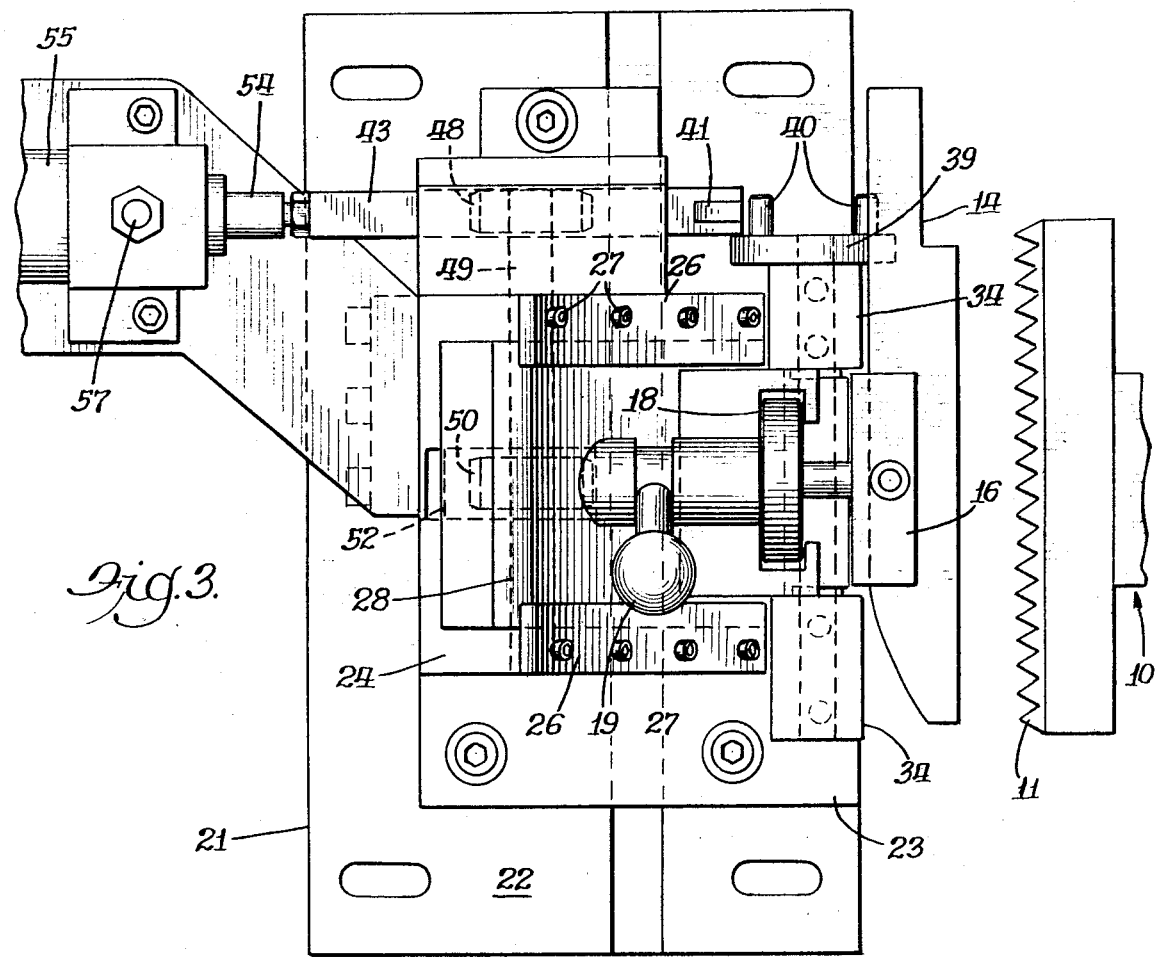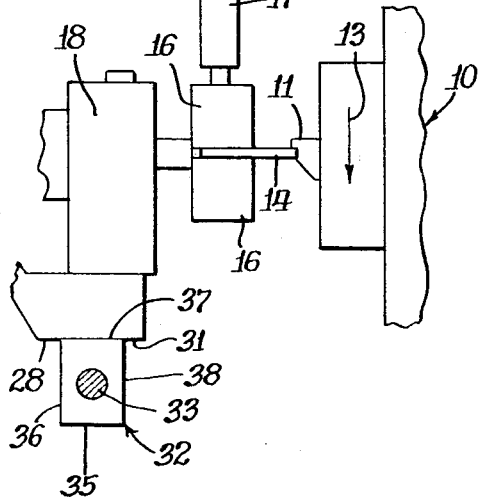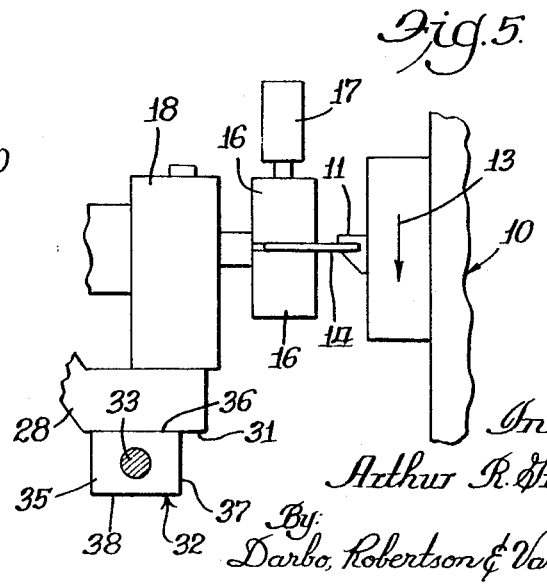

3,596,559

SHUTTLE FIXTURE FOR BROACH OR THE LIKE

SUMMARY OF THE INVENTION

This invention relates to a comparatively simple holder for a workpiece acted on by a broach or the like which holder will securely position the workpiece at various positions with respect to the broach cutting tool.

DESCRIPTION OF THE DRAWINGS

FIG. 1 is a perspective view of an embodiment of the invention;

FIG. 2 is a side elevation of the embodiment of FIG. 1, partially in section, illustrated in conjunction with a portion of a broach;

FIG. 3 is a plan view of the illustrated embodiment;

FIG. 4 is a diagrammatic illustration of the workpiece in one position with respect to the broach, and FIG. 5 is a diagrammatic view of the workpiece held in a second position with respect to the broach.

DESCRIPTION OF SPECIFIC EMBODIMENT

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The present invention is used in conjunction with a broach generally 10, having a cutting tool 11 which is reciprocated vertically by means of the broach mechanism. The details of the broach mechanism form no part of the present invention. The tool 11 moves upwardly and downwardly in a vertical path as indicated by arrow 12 in FIG. 2. The cutting movement takes place on the downward stroke as indicated by arrows 13 in FIGS. 4 and 5. In the illustrated embodiment saber saw blades are being made from a workpiece 14 and the cutting tool 11 is appropriately formed. As will hereinafter be apparent, the saber saw blades are cut with two passes of the tool 11, the first cut being only of a partial depth, and the second cut being the full depth of the desired teeth. To do this the cutting tool makes two cutting passes at the workpiece with the workpiece being indexed toward the path of the cutting tool between passes. During the return movement of the cutting tool, the workpiece is indexed out of the path of the cutting tool so that the workpeice will not come into contact with the cutting piece at that time.

The workpiece is held between the jaws 16 of a workpeice holder, which jaws are opened and closed by a power mechanism 17, such as an air cylinder. The workpiece holder comprising jaws 16 is chucked into a holder 18 actuated by an operating lever 19. Again the details of these workpiece holders form no part of the present invention. They will be varied depending upon the configuration, etc., of the workpiece.

The apparatus for positioning the workpiece holder and workpiece comprises a frame generally 21 which includes a main base 22 of a configuration suitable for mounting on the broach and a secondary base 23 which may be adjustably moved on the main base 22, and fixed in a selected position. Above the secondary base the frame includes a block 24 having a groove 25 on the front angular face thereof. Side plates 26 are fixed to block 24 by stud bolts 27 and overhang the sides of groove 25, thus forming a way or guide for a slide 28. Holder 18 is affixed to slide 28.

Slide 28 has a projection extending outwardly from the bottom thereof which forms an abutment 31 which is positioned to contact a rotatable stop means generally 32. This stop means includes a shaft 33 journaled in bosses 34 of frame 21. Centrally between bosses 34, the stop means forms four stop faces 35—38. Faces 35 and 37 are equidistant from the axis of rotation of shaft 33, as are faces 36 and 38. However, faces 36, 38 are closer to that axis than are faces 35 and 37. At one end a ratchet wheel 39 having pins 40 is secured to shaft 33. A ratchet dog or finger 41 is pivotally attached by a pin 42 to a rack 43. A spring 44 (FIG. 2) resiliently urges dog 41 to the vertical position, from which position the dog can pivot outwardly (to the right in FIG. 2) against said urging. Rack 43 is suitably mounted in frame 21 for movement longitudinally of the rack. The teeth 47 of the rack engage a pinion 48. Pinion 48 is attached to a shaft 49 journaled in frame 21. A pinion 50 also is secured to shaft 49 and engages teeth 51 of a rack 52 on slide 28.

Rack 43 is secured to piston rod 54 of an air cylinder 55 mounted on frame 21. Air lines 56 and 57 connect air cylinder 55 to an actuating valve 58. The valve actuator 59 is operatively connected to the broach, as indicated by line 60. The connection is such that the valve is set to retract piston rod 54 after the tool 11 passes the workpiece 14 and to hold it in that position until the tool 11 passes the workpiece 14 on the upward stroke. Between that time and the time that the tool 11 approaches the workpiece 14 on the downward stroke, the piston rod 54 is extended.

At the start of the operation, the cutting tool 11 will be approximately at the top of the stroke and the slide 28 will be raised (as illustrated in FIG. 2) by the retraction of piston rod 54. At this time the operator inserts a workpiece 14 into the jaws 16 of the workpiece holder. As the tool 11 commences the downward stroke, valve 58 is actuated so as to extend piston rod 54. The resulting movement of rack 43 pushes dog 41 against one of the pins 40 of the ratchet wheel, rotating the ratchet wheel approximately 90° in a clockwise direction as viewed in FIG. 2. The rack also rotates shaft 49 so as to cause slide 28 to move downwardly; the limit of downward movement of slide 28 is determined by the abutment 31 contacting face 37. If the face 37 is not in exact alignment with abutment 31 as contact between the two initially commences, it will be rotated slightly into alignment by the full contact between the two.

At this point the position of workpiece 14 is illustrated in FIG. 4 and illustrated in dotted lines at 14a in FIG. 2. The tool 11 now passes the workpiece on its downward stroke and makes the first cut therein. The slide 28, and thus the workpiece 14, are securely held in this fixed position by reason of the fact that the force on the workpiece is primarily downwardly, which is primarily resisted by the stop means 32, and to some extend outwardly away from the tool, which is resisted by the mounting of slide 28 in the way formed by groove 25 and side plates 26.

After tool 11 has passed workpiece 14 during its downward stroke, valve 58 is again actuated to cause air cylinder 55 to retract piston rod 54. A retracting movement of rack 43 rotates shaft 49 to raise slide 28. Dog 41 is turned somewhat into alignment with rack 43 (against the urging of spring 44) with the dog flopping over the pin 40 to the rearwardly side thereof. Sufficient friction can be applied to shaft 33 to insure that this does not rotate as the dog moves back over the pin.

The workpiece 14 now returns to the full line position illustrated in FIG. 2. While in this position, the tool 11 returns upwardly to the top of its stroke. Before the tool 11 gets very far on its downward stroke, valve 58 is actuated to again extend piston rod 54. The movement of rack 43 to the right in FIG. 2 again rotates the stop means 32 through a distance of approximately 90° and causes slide 28 to move downwardly. This time, however, the slide moves downwardly a short distance farther than it did before since the stop face 36 now is positioned in the path of movement of the abutment 31. This additional downward movement of slide 28 causes the workpiece holder 18 and the workpiece 14 to move closer to the path of tool 11, since one of the coordinates of the angular line of movement of slide 28 is in a horizontal direction. Upon the completion of movement of slide 28 (i.e. when abutment 31 comes into face to face contact with stop face 36) the workpiece 14 is in the position illustrated in FIG. 5 and as illustrated in dotted lines at 14b in FIG. 2. Now as the tool 11 passes the workpiece 14 it makes a deeper, and finishing cut, in the workpiece.

As the tool 11 gets below the workpiece, valve 58 is actuated to again retract piston rod 54. This raises the slide 28 and workpiece 14 so that the tool 11 will clear the workpiece on its return upward stroke. During this time the operator places a new workpiece 14 in the jaws 16. Thus, as the tool 11 is ready to commence its downward stroke, valve 58 can be repositioned to again move the workpiece to the FIG. 4 position at which the first cut is made.

In the illustrated embodiment there are four stop faces on stop means 32, the four faces being in two pairs. Obviously, if four cuts were to be made by tool 11 in workpiece 14, these four faces all would be different radial distances from the axis of shaft 33. For the first cut the abutment 31 would contact the stop face farthest from the axis, while for the second cut the abutment 31 would contact the stop face next farthest from the axis, etc. A number of stop faces other than four can be employed by changing the number of steps of the ratchet mechanism, i.e. changing the number of pins 40 employed on the ratchet wheel.

I claim:

1. In a positioning apparatus for a workpiece holder and having a front adjacent the workpiece for use in positioning the holder a plurality of positions spaced from each other in a given path, said apparatus comprising:
    a frame;
    a slide mounted on said frame and movable along a line with respect to said frame toward and away from said front, said line lying in a plane which includes said path and is angularly positioned with respect to said path, said slide having an abutment portion, said slide supporting said workpiece holder;
    movable stop means mounted on said frame and positioned in alignment with the abutment portion to intercept the slide as the slide moves toward the front of said apparatus, said stop means including a member rotatable about an axis normal to said line, said member having a plurality of faces at different radial distances from said axis; and
    power means on said frame and connected to said slide to reciprocate said slide toward and away from said front and connected to said stop means to change the position of the stop means along said line while said slide is positioned away from the stop means, said power means being connected to rotate said member.

2. In an apparatus as set forth in claim 1, wherein said line and said path are angularly positioned with respect to each other, said stop means including a member rotatable about an axis normal to said line, said member having a plurality of faces at different radial distances from said axis, said power means being connected to rotate said member.

3. In an apparatus as set forth in claim 2, wherein said power means includes a fluid cylinder having a reciprocating piston rod, ratchet means operatively connected to said piston rod and to said member to rotate the member with each reciprocation of the piston rod, said piston rod being operatively connected to said slide to move the slide away from and toward the front with each reciprocation of the piston rod.

4. In a positioning apparatus for use with a machine such as a broach or the like having a cutting tool reciprocating in a path past a workpiece held by a workpiece holder mounted on the apparatus with the tool making a cut when moving in one direction, said apparatus comprising:
    a frame;
    a slide mounted on the frame and movable along a line with respect to the frame and toward and away from said path, said line lying in a plane which includes said path and with an acute angle between said line and said path, said slide supporting said workpiece holder, said slide having an abutment portion, said slide being movable between an ineffective position at which the tool clears the workpiece as the tool passes the workpiece and a plurality of effective positions at which the tool engages the workpiece as the tool moves past the workpiece,
    stop means mounted on said frame and having a stop face in a plane transverse to said path and positioned to contact said abutment portion when said slide is in the effective positions and to transmit to said frame at least a substantial portion of said force exerted on said slide when said tool engages the workpiece, said stop means being movable with respect to said frame to a plurality of positions corresponding to the positions of the abutment at said plurality of effective positions of the slide; and
    power means connected to said slide to move said slide between said positions thereof and connected to said stop means to move said stop means between said positions thereof.

5. In an apparatus as set fourth in claim 4, including control means connected to said machine and to said power means to move said slide to said ineffective position after said tool has moved past the workpiece in said one direction and, after said tool has moved past the workpiece in the opposite direction, to move said slide to an effective position and to move said stop means to a position corresponding to said effective position of the slide.

6. In an apparatus as set forth in claim 5, wherein said stop means including a member rotatable about an axis normal to said line, said member having a plurality of faces at different radial distances from said axis, said power means being connected to rotate said member.

7. In an apparatus as set forth in claim 6, wherein said power means includes a fluid cylinder having a reciprocating piston rod, ratchet means operatively connected to said piston rod and to said member to rotate the member with each reciprocation of the piston rod, said piston rod being operatively connected to said slide to move the slide away from and toward the path with each reciprocation of the piston rod.

8. In an apparatus as set forth in claim 4, wherein said stop means including a member rotatable about an axis normal to said line, said member having a plurality of faces at different radial distances from said axis, said power means being connected to rotate said member.

9. In an apparatus as set forth in claim 8, wherein said power means includes a fluid cylinder having a reciprocating piston rod, ratchet means operatively connected to said piston rod and to said member to rotate the member with each reciprocation of the piston rod, said piston rod being operatively connected to said slide to move the slide away from and toward the path with each reciprocation of the piston rod.

10. In an apparatus including a frame and wherein a tool member cuts a workpiece member while one of said members moves in a path adjacent the other member during a cutting movement and said other member is held by a holder and advances in the sense toward said path after one cutting movement by said one member and before the next cutting movement, including a slide to which said holder is affixed, said slide having a portion forming an abutment, guide means connecting said frame and slide for aligning said slide for movement along a line intersecting said path and positioned at an angle with respect to said direction so that as said slide moves in the general direction toward said path one of the coordinates of movement along said line is in said sense, stop means mounted on said frame in a position to intersect said portion as said slide moves in said general direction, and power means connected to said slide for moving said slide in said general direction and against said stop means prior to a cutting movement, the improvement comprising:
    said stop means being rotatably mounted in said frame for rotation about an axis and having a plurality of stop faces which are at different radial distances from said axis, said power means being connected to said stop means for rotating said stop means between said cutting movements to present a different stop face to said abutment as said slide moves toward the stop means prior to the next cutting movement.

11. In an apparatus as set forth in claim 10, wherein said tool member is a broach which moves in a linear path to make a cutting movement and then returns along said path between cutting movements, said workpiece member is held by said holder, and said power means retracts said slide in the general direction away from said path between cutting movements.

12. In an apparatus as set forth in claim 10, wherein said guide means positions said slide so that when said slide moves in said general direction the other coordinate of said slide's movement corresponds to the direction of movement of the tool member as it makes a cutting movement, said axis being positioned transversely to said path, said abutment and said faces, when in abutment intercepting position, being parallel and in planes normal to said path.

13. In an apparatus as set forth in claim 12, wherein said power means includes a ratchet connection to said stop means to rotate said stop means through an angle substantially corresponding to the angular positioning of said faces about said axis.

UNITED STATES PATENT OFFICE
CERTIFICATE OF CORRECTION

Patent No. 3,596,559　　　　　　　Dated　August 3, 1971

Inventor(s)　Arthur R. Gregersen

It is certified that error appears in the above-identified patent and that said Letters Patent are hereby corrected as shown below:

Abstract, line 10, "an" should be -- and --.

Col. 3, line 56, "2" should be -- 1 --.

Signed and sealed this 7th day of March 1972.

(SEAL)
Attest:

EDWARD M. FLETCHER, JR.　　　　　ROBERT GOTTSCHALK
Attesting Officer　　　　　　　　 Commissioner of Patents